(12) United States Patent
Furman et al.

(10) Patent No.: US 10,355,496 B1
(45) Date of Patent: Jul. 16, 2019

(54) INTER-MODULE BATTERY BALANCING USING MINIMUM CELL VOLTAGES TO SELECT BATTERY SUB-MODULES TO POWER LOADS

(71) Applicant: Kitty Hawk Corporation, Mountain View, CA (US)

(72) Inventors: Scott Furman, Menlo Park, CA (US); Lewis Romeo Hom, Mountain View, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 16/046,312

(22) Filed: Jul. 26, 2018

(51) Int. Cl.
*H02J 7/00* (2006.01)

(52) U.S. Cl.
CPC .......... *H02J 7/0014* (2013.01); *H02J 7/0016* (2013.01); *H02J 7/0021* (2013.01); *H02J 7/0024* (2013.01); *H02J 7/0068* (2013.01)

(58) Field of Classification Search
CPC ...... H02J 7/0014; H02J 7/0016; H02J 7/0068; H02J 7/0024; H02J 7/0021
USPC .......................................................... 320/118
See application file for complete search history.

(56) References Cited

U.S. PATENT DOCUMENTS

| | | | |
|---|---|---|---|
| 2013/0026991 A1 | 1/2013 | Roessler | |
| 2013/0187611 A1* | 7/2013 | Suzuki | H01M 10/441 320/118 |
| 2014/0242420 A1* | 8/2014 | Schaffner | H01M 10/486 429/9 |
| 2016/0241054 A1* | 8/2016 | Matsumoto | B60L 3/0046 |
| 2016/0254683 A1* | 9/2016 | Matsumoto | H02J 7/0014 320/118 |

* cited by examiner

*Primary Examiner* — Nathaniel R Pelton
*Assistant Examiner* — Manuel Hernandez
(74) *Attorney, Agent, or Firm* — Van Pelt, Yi & James LLP

(57) ABSTRACT

For each battery sub-module in a plurality of battery sub-modules, a voltage associated with a cell in that battery sub-module is received wherein each battery sub-module in the plurality of battery sub-modules includes a plurality of cells. A battery sub-module is selected based at least in part on the received voltages and a set of one or more loads, which draws power from the selected battery sub-module and is not powered by any other battery sub-module in the plurality of battery sub-modules, is configured so that the set of loads at least temporarily does not draw power from the selected battery sub-module.

15 Claims, 11 Drawing Sheets

US 10,355,496 B1

INTER-MODULE BATTERY BALANCING USING MINIMUM CELL VOLTAGES TO SELECT BATTERY SUB-MODULES TO POWER LOADS

BACKGROUND OF THE INVENTION

New types of aircraft that are all-electric are being developed. Due to differences in how the batteries tend to be designed (e.g., batteries in aircraft have to satisfy the Federal Aviation Administration, which may have more concerns about single points of failure and degrees of redundancy compared to the National Highway Traffic Safety Administration) and/or how the vehicles are used, there may be some battery-related issues which are exposed as all-electric aircraft are developed which were not previously exposed with electric cars. New techniques to detect, mitigate, and/or avoid such battery-related issues in all-electric aircraft (or other vehicles) would be desirable.

BRIEF DESCRIPTION OF THE DRAWINGS

Various embodiments of the invention are disclosed in the following detailed description and the accompanying drawings.

FIG. 3A is a diagram illustrating an embodiment of a battery sub-module without its lid on.

FIG. 3B is a diagram illustrating an embodiment of a battery sub-module without its lid on.

DETAILED DESCRIPTION

Figure 1:
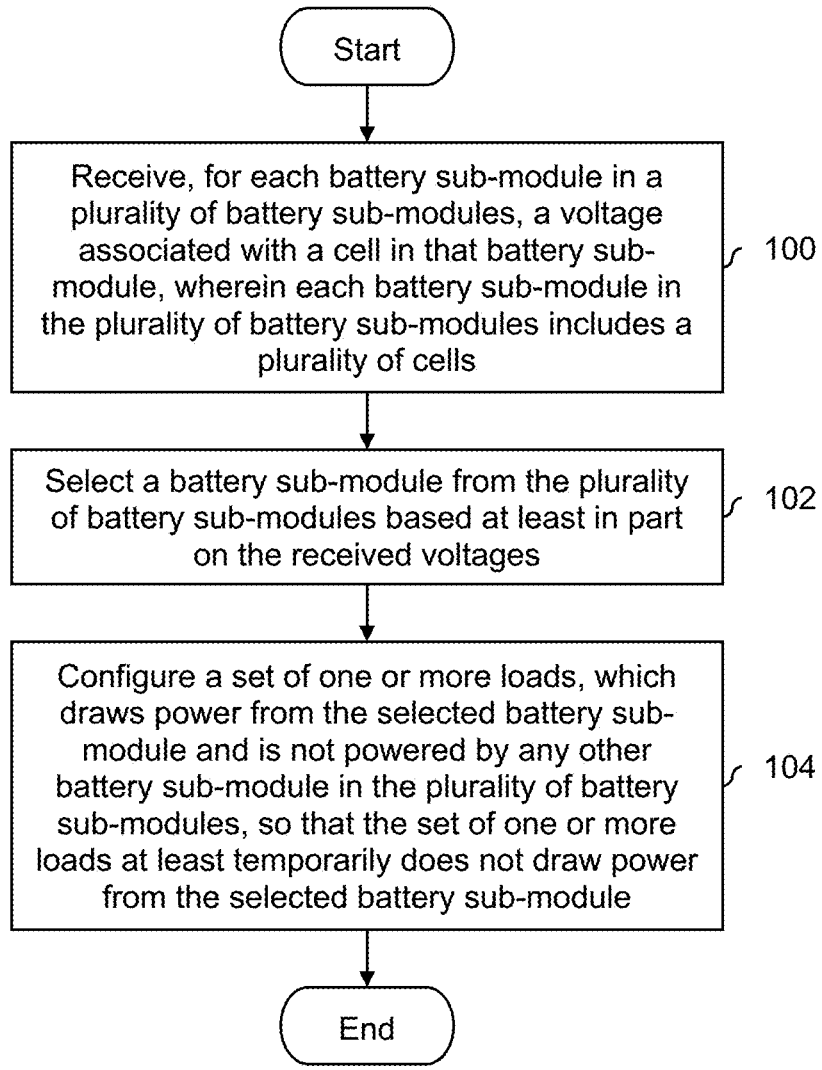
FIG. 1 is a flowchart illustrating an embodiment of a process for inter-module balancing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to balance battery sub-modules in a battery system are described herein. In some embodiments, balancing is performed by receiving, for each battery sub-module in a plurality of battery sub-modules (e.g., connected together in series), a voltage associated with a cell in that battery sub-module, where each battery sub-module in the plurality of battery sub-modules includes a plurality of cells (e.g., connected together in series). A battery sub-module is selected from the plurality of battery sub-modules based at least in part on the received voltages. A set of one or more loads (e.g., electronics or other consumers of power), which draws power from the selected battery sub-module and is not powered by any other battery sub-module in the plurality of battery sub-modules, is configured so that the set of one or more loads at least temporarily does not draw power from the selected battery sub-module.

In some applications, this technique is used to select which battery sub-modules do not (e.g., at least temporarily) supply standby or vampire power to corresponding electronics while a primary load (e.g., the lift fans in an all-electric aircraft) is not drawing power from the battery system. In the long run, if this process is performed, then the battery sub-modules will be more balanced than if the process had not been performed (e.g., where battery sub-modules which are more balanced are better for performance) and/or permanent damage to the battery sub-modules can be avoided.

FIG. 1 is a flowchart illustrating an embodiment of a process for inter-module balancing. In some embodiments, the process is performed by and/or on a battery system with multiple sub-modules connected together in series where each battery sub-module in turn includes multiple cells connected together in series.

At 100, for each battery sub-module in a plurality of battery sub-modules, a voltage associated with a cell in that battery sub-module is received, wherein each battery sub-module in the plurality of battery sub-modules includes a plurality of cells. In one example, a battery system is used to power an all-electric aircraft. For a variety of reasons, the battery system which powers the aircraft may be made up of multiple battery sub-modules which are connected together in series. For example, by having multiple battery sub-modules connected together in series to form the overall battery system, the battery sub-modules can be easily replaced as or if needed, and relatively high voltages (e.g., on the order of hundreds of volts, which is required by the lift fans) as well as lower voltages (e.g., on the order of single volts, which is required by the avionics and/or electronics) are simultaneously available. In contrast, these desirable characteristics and/or features are not present when the battery system comprises a (more) monolithic battery. An exemplary battery system, which includes battery sub-modules (connected together in series) which in turn include cells (also connected together in series) is described in more detail below.

At 102, a battery sub-module is selected from the plurality of battery sub-modules based at least in part on the received voltages. For example, the selected battery sub-module may have been selected because it is undesirable for that battery sub-module to continue supplying power to one or more loads (e.g., electronics, motors, solenoids, etc.) which are running off of the selected battery sub-module. In some embodiments, more than one battery sub-module is selected. Some examples of how the selection may be performed are described in more detail below.

At 104, a set of one or more loads, which draws power from the selected battery sub-module and is not powered by any other battery sub-module in the plurality of battery sub-modules, is configured so that the set of one or more loads at least temporarily does not draw power from the selected battery sub-module. As will be described in more detail below, in some embodiments, the loads comprise electronic(s) which are turned off so that they no longer draw (e.g., vampire) power from the selected and/or associated battery sub-module. Alternatively, the electronic(s) associated with the selected battery sub-module may be configured so that they draw power from some other battery sub-module other than the selected one.

Conceptually and/or generally speaking, the above process attempts to balance the voltage levels in the various sub-modules and/or cells by selectively permitting some (but not all) battery sub-modules to provide power to associated loads, for example during some quiescent or resting state when an aircraft (or other load) is not consuming substantial amounts of power. This draws down the voltage levels in sub-modules and/or cells (e.g., which are better equipped and/or in a better state to provide power) so that voltage levels in the selected sub-modules and/or selected cells can be preserved.

In one example of why balancing is important and/or useful, if no balancing is performed (e.g., per the process of FIG. 1), then some battery sub-modules in the battery system will permanently fail if the battery system is left alone for ~20 days. If the battery system is used in an aircraft, this is entirely possible. For example, the pilot may fly the aircraft somewhere remote with no charging station where the aircraft sits idle for ~20 days and the battery not being charged during that time. Or, the aircraft could be left in a hangar for long periods of time so maintenance requiring human intervention would be quite inconvenient.

Another benefit to keeping the battery sub-modules balanced is that it increases the capacity of the battery due to the fact that for batteries comprising sub-modules in series, the battery's capacity is driven by the minimum capacity cell. This is because discharging a battery below its minimum capacity will damage it. In the same vein, keeping the sub-modules balanced decreases the time it takes to charge since in the balanced state, the cells will be at a uniform and higher voltage relative to the imbalanced state. Finally, maintaining a balanced battery can increase its overall life. Cells with depressed voltages may degrade more quickly than their neighbors and the sub-module must be replaced when one of its component cells reaches a critical point of degradation. Furthermore, in embodiments that allow for sub-modules to be discharged in parallel, sub-modules at different voltages will contribute different currents its load and sub-modules that must contribute excess current will experience accelerated degradation. The process of FIG. 1 may be repeated as or if desired. For example, with the unselected battery sub-modules providing power, the voltage levels stored in those cells and/or battery sub-modules will go down, resulting in different voltage levels and thus different degrees and/or states of imbalance. In one example, the battery sub-modules selected at step 102 do not supply power during step 104 for 15 minutes (as an example), after which the process of FIG. 1 is repeated with updated voltages. As a result, different battery sub-modules may be selected at step 102 to at least temporarily no longer supply power to their corresponding electronics.

In some embodiments, the exemplary balancing process described above is performed when a primary load (e.g., the lift fans in an all-electric aircraft) is not drawing power. For example, the draw by the primary load on the battery system may change very quickly and so it may be difficult and/or expensive to sample the battery system sufficiently fast enough to accurately determine what state the battery system is in when the primary load is drawing power. For this reason, it may be simpler and/or easier to perform balancing when the primary load is off.

In some embodiments, the exemplary balancing process described above is performed before and/or after charging of the battery system is performed. For example, by balancing the battery system (e.g., per the process of FIG. 1) before charging of said battery system occurs may help with the charging process itself by fixing or otherwise reducing large(r) imbalances (if any) between battery sub-modules (e.g., which may be undesirable during the charging process). If balancing (e.g., per the process of FIG. 1) is performed after the battery system is charged, then small(er) imbalances between the battery sub-modules may be fixed or otherwise reduced.

It may be helpful to describe an exemplary battery system which performs the process of FIG. 1. The following figure describes one such exemplary battery system.

Figure 2:
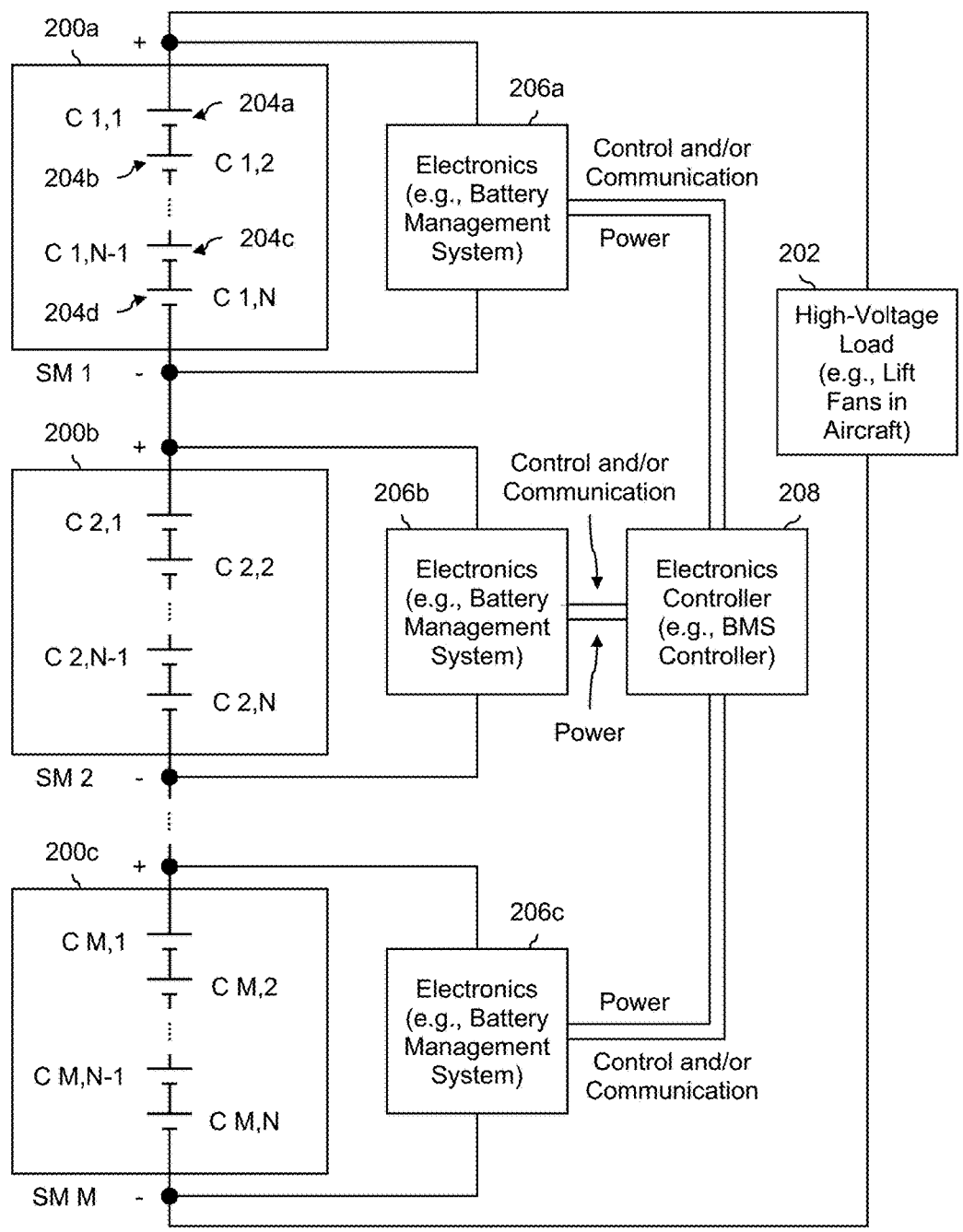
FIG. 2 is a diagram illustrating an embodiment of a battery system which includes battery sub-modules connected together in series where each battery sub-module includes cells connected together in series.

FIG. 2 is a diagram illustrating an embodiment of a battery system which includes battery sub-modules connected together in series where each battery sub-module includes cells connected together in series. In this example, the battery system is used to power an all-electric aircraft.

In this example there are M battery sub-modules: a first battery sub-module (200a), a second battery sub-module (200b), and an $M^{th}$ battery sub-module (200c) where the battery sub-modules are connected together in series. This produces a high voltage power source (e.g., on the order of hundreds of volts) which powers a high-voltage load (202), such as the lift fans of the aircraft.

Each battery sub-module, in turn, includes N cells which are connected together in series. For example, the first battery sub-module (200a) includes a first cell (204a), a second cell (204b), an $(N-1)^{th}$ cell (204c), and an $N^{th}$ cell (204d). The voltage across each battery sub-module in this example is on the order of tens of volts. In this example, there are 36 battery sub-modules and 12 cells per battery sub-module. The following figures show an exemplary battery sub-module.

Figure 3A:
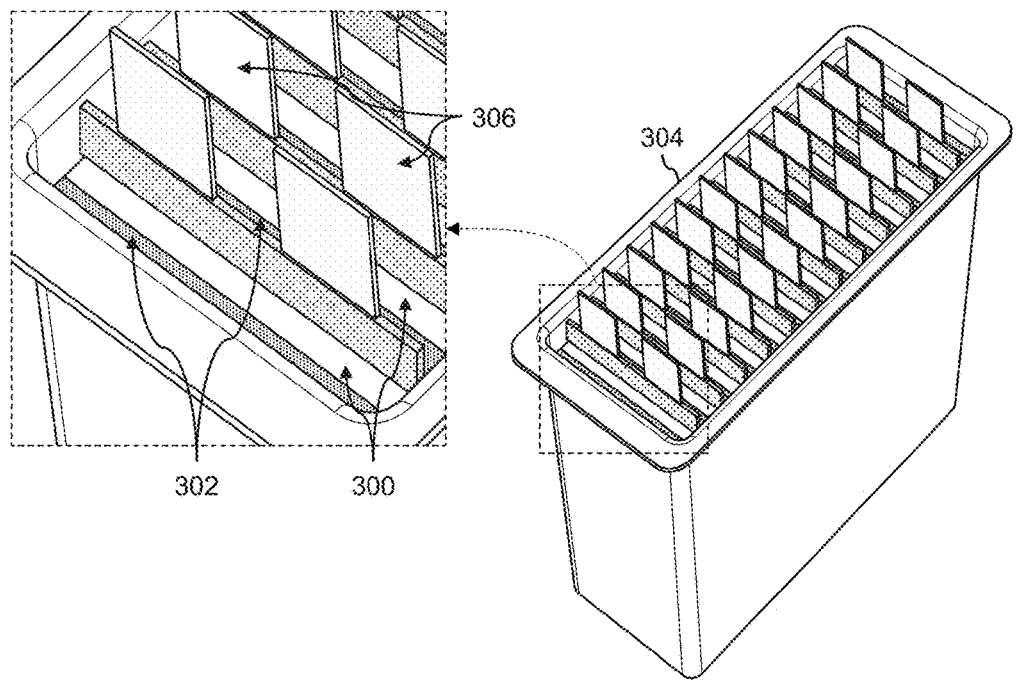

FIG. 3A is a diagram illustrating an embodiment of a battery sub-module without its lid on. In the example shown, the battery sub-module includes layers of cells (300) interleaved with layers of (e.g., fire-retardant) insulation (302). In this example, the cells are pouch cells which perform better when pressure is applied (e.g., ~3-5 PSI). More specifically, the cycle life of pouch cells can be extended by applying pressure to the pouch cells. As such, the battery sub-module is encased by a metal can (304) which applies pressure on the contained pouch cells.

Each of the cells has two tabs (306) which extend upward from the cell: a positive tab and a negative tab. The tabs are connected together so that the cells are connected together electrically in series. See, for example FIG. 2.

Figure 3B:
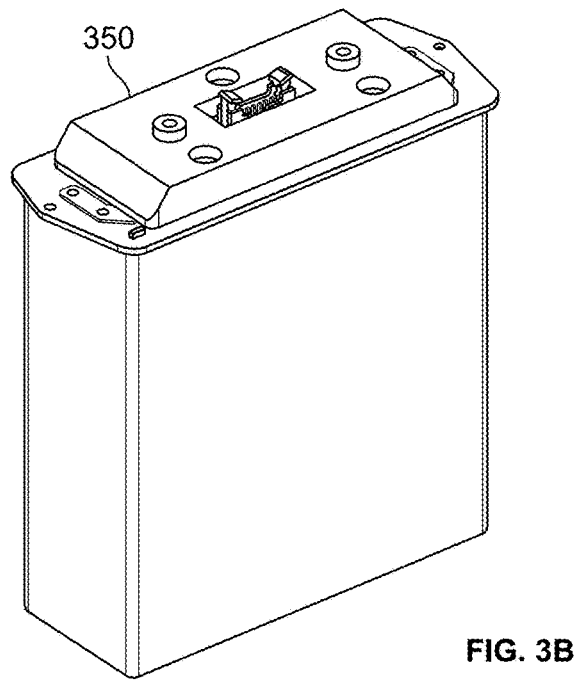

FIG. 3B is a diagram illustrating an embodiment of a battery sub-module without its lid on. In this example, a lid (350) has been attached to the battery sub-module, so that only a single positive connection and a single negative connection are exposed. In the example described above where the battery system is included in an aircraft, each battery sub-module may be physically and electrically connected together within the aircraft so that a single battery sub-module can be swapped out and replaced as or if needed.

Returning to FIG. 2, each battery sub-module (200a-200c) has a set of electronics (206a-206c) which are associated with it and are powered by that battery sub-module (e.g., even when the aircraft is not flying and the high-voltage load (202) is not consuming power). For example, the first set of electronics (206a) is powered by the first battery sub-module (200a), the second set of electronics (206b) is powered by the second battery sub-module (200b), and the $M^{th}$ set of electronics (206c) is powered by the $M^{th}$ battery sub-module (200c). For brevity and to preserve the readability of the figure, voltage converters (e.g., which step down the voltage produced by battery sub-modules to a voltage level that is expected by the electronics) are not shown herein but may be used as or if needed.

The electronics (206a-206c) in this example include battery management systems (BMS) which monitor and/or record metrics and/or measurements associated with the cells within the associated battery sub-module over time. In some embodiments, the battery management systems monitor and/or track the voltages of each of the cells in the associated battery sub-modules over time. The electronics controller (208) controls the various electronics (206a-206c) in ways described in more detail below.

This type of battery arrangement may be better suited for aircraft applications compared to car applications. For example, the Federal Aviation Administration may have very stringent requirements when it comes to redundancy and/or potential single points of failures. By arranging multiple battery sub-modules in series with backup connections not shown, the overall battery system can still work and output a high-voltage signal for the high-voltage load (202) even if one of the battery sub-modules fails. In contrast, the National Highway Traffic Safety Administration may not care as much about redundancy and/or potential single points of failures because if the battery fails, the car can just coast and pull over to the shoulder whereas an aircraft would crash. For these and other reasons, battery systems for electric cars tend to be more monolithic (e.g., with relatively few battery sub-modules and/or relatively few cells per battery sub-module compared to battery systems for aircrafts).

Due to slight differences between the various cells and various battery sub-modules, the voltages across the cells and battery sub-modules are not all the same. Furthermore, due to the configuration shown here, battery sub-modules which have less charge will be used to supply power more than battery sub-modules which have more charge (e.g., if inter-module balancing, one example of which is described in FIG. 1, is not performed) while the high-voltage load (202) is off and the electronics (206a-206c) are on (e.g., when the aircraft is powered down). To use an analogy, the rich (sub-modules) stay rich and the poor (sub-modules) stay poor. To address this, electronics controller 208 (e.g., including a BMS controller) performs the balancing process of FIG. 1.

In the context of this example system, step 100 of FIG. 1 is initiated when the electronics controller (208) decides to perform the process of FIG. 1. As described above, balancing may be performed before and/or after charging but (e.g., for simplicity and/or to avoid expensive sampling equipment) balancing is not performed when the high-voltage load is drawing power from the battery system.

Once the process of FIG. 1 begins, the electronics controller (208) sends a signal to each set of electronics (206a-206c) to send back one or more voltages associated with a cell in the associated battery sub-module. For example, the voltage sent back to the electronics controller may be the minimum (e.g., lowest) voltage of all of the cells in that battery sub-module, sometimes referred to herein as the minimum cell voltage (e.g., for a given battery sub-module). In some other embodiments, some other type of cell voltage (e.g., as a maximum cell voltage or a median or mean cell voltage) is/are sent to the electronics controller in addition to and/or in place of a minimum cell voltage. Using the voltages received from the electronics (206a-206c), the electronics controller selects at least one set of electronics. In one example, the electronics with the global minimum cell voltage (e.g., the controller picks the minimum of the minimum cell voltages) are selected (e.g., because continuing to draw power from that battery sub-module may permanently damage the battery sub-module if the cell with the minimum cell voltage goes below some threshold and/or unrecoverable cell voltage level). This is one example of step 102 in FIG. 1.

In this example, there are two paths between each set of electronics (206a-206c) and the electronics controller (208). One path is for communications and/or or control and the other path is for power. The latter incorporates a switch to interrupt power to the electronics controller from a given battery sub-module and/or set of electronics. The control and/or communications path is always connected and available (e.g., to allow the controller to interrogate cell voltages and to control the state of the aforementioned switch in response to voltage measurements).

The electronics controller then configures the selected electronics so that it does not draw power (e.g., to the degree possible since there is typically some level of vampire power consumption even if things are "turned off") from its associated battery sub-module. In some embodiments, the electronic controller turns off the selected electronics to achieve this goal. Alternatively, the electronic controller in some other embodiments configures the selected electronics (and/or any other components) so that power from a given battery sub-module is not sent upstream to the electronics controller (208). For example, even if electronics 206a is in power minimization mode and not providing any power to the controller (208), the controller (208) can still interrogate battery management system 206a for its voltages, etc. This may be desirable in applications where it is desirable to keep the electronics accessible. For example, as described above, a battery management system tracks and/or monitors metrics associated with the associated battery sub-module and/or the cells within. It may be desirable to keep tracking such metrics and/or measurements, for example by obtaining power from another battery sub-module. These are some examples of how step 104 in FIG. 1 may be performed.

Without balancing, one or more of the battery sub-modules may be irreparably damaged within as soon as ~20 days. For example, if the voltage level of a cell drops below some voltage level and power continues to be drawn from that cell, the cell will be irreparably damaged and as a result the entire battery sub-module will need to be replaced.

The following figures describe some of the examples described above more generally and/or formally in flowcharts.

Figure 4:
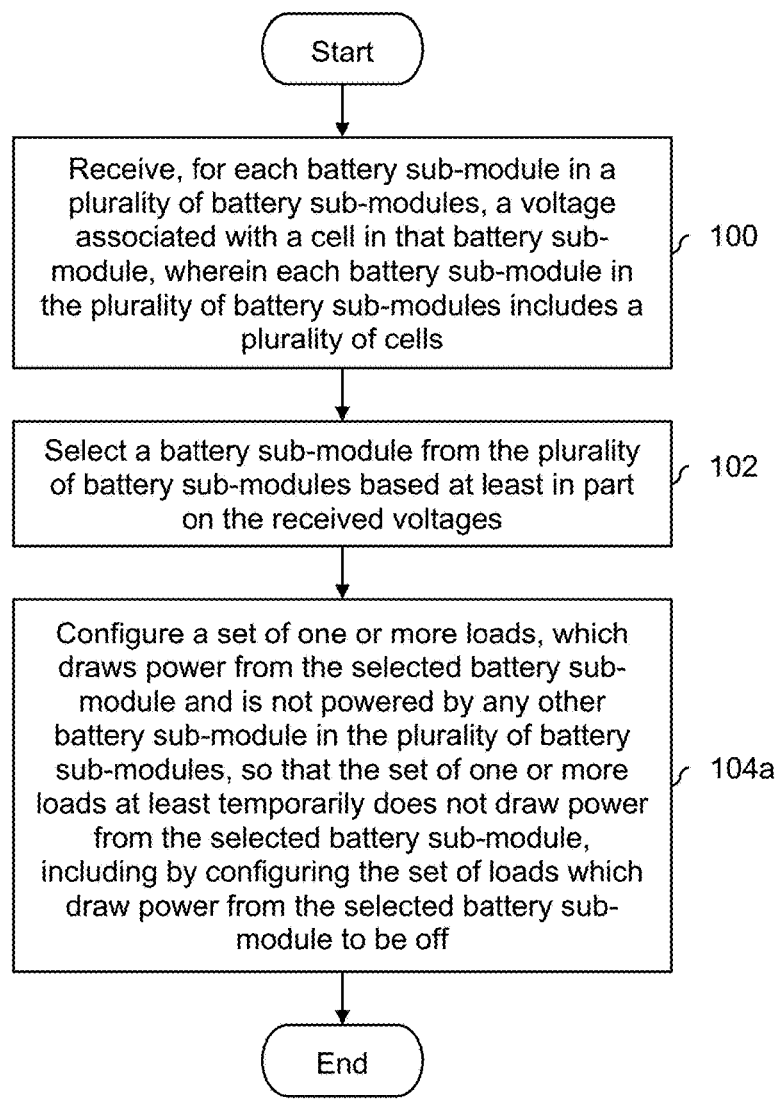
FIG. 4 is a flowchart illustrating an embodiment of a process for inter-module balancing, including by turning off electronics.

FIG. 4 is a flowchart illustrating an embodiment of a process for inter-module balancing, including by turning off electronics. FIG. 4 is related to FIG. 1 and, for convenience, related steps are indicated using similar or the same reference numbers.

At 100, for each battery sub-module in a plurality of battery sub-modules, a voltage associated with a cell in that battery sub-module is received, wherein each battery sub-module in the plurality of battery sub-modules includes a plurality of cells. For example, the electronics controller (208) in FIG. 2 receives at least one voltage from each of electronics (206a-206c) where each received voltage is associated with a cell in the corresponding or associated battery sub-module (200a-200c).

At 102, a battery sub-module is selected from the plurality of battery sub-modules based at least in part on the received voltages. Some examples of how the selection may be performed are described in more detail below. In some embodiments, multiple battery sub-modules are selected.

At 104a, a set of one or more loads, which draws power from the selected battery sub-module and is not powered by any other battery sub-module in the plurality of battery sub-modules, is configured so that the set of one or more loads at least temporarily does not draw power from the selected battery sub-module, including by configuring the set of loads which draws power from the selected battery sub-module to be off. For example, if the first battery sub-module (200a) in FIG. 2 is selected, then loads controller 208 may configure the first set of loads 206a so that they are off and do not draw power from the first battery sub-module (200a).

Figure 5:
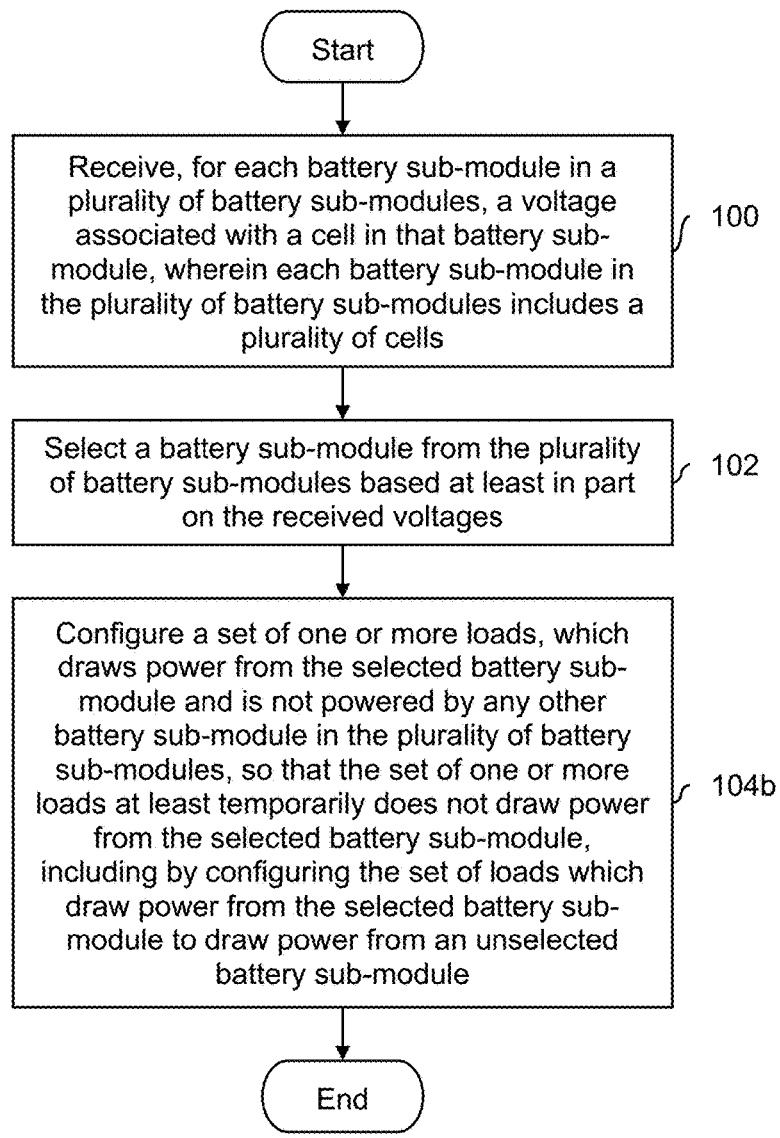
FIG. 5 is a flowchart illustrating an embodiment of a process for inter-module balancing, including by configuring a set of electronics to draw power from an unselected battery sub-module.

FIG. 5 is a flowchart illustrating an embodiment of a process for inter-module balancing, including by configuring a set of electronics to draw power from an unselected battery sub-module. FIG. 5 is related to FIG. 1 and, for convenience, related steps are indicated using similar or the same reference numbers.

At 100, for each battery sub-module in a plurality of battery sub-modules, a voltage associated with a cell in that battery sub-module is received, wherein each battery sub-module in the plurality of battery sub-modules includes a plurality of cells.

At 102, a battery sub-module is selected from the plurality of battery sub-modules based at least in part on the received voltages. As described above, in some embodiments, multiple battery sub-modules are selected (e.g., because multiple battery sub-modules are in a poor state to supply power and/or may be irreparably damaged if they continue to supply power and are thus selected).

At 104b, a set of one or more loads, which draws power from the selected battery sub-module and is not powered by any other battery sub-module in the plurality of battery sub-modules, is configured so that the set of one or more loads at least temporarily does not draw power from the selected battery sub-module, including by configuring the set of loads which draws power from the selected battery sub-module to draw power from an unselected battery sub-module.

In some applications, it is undesirable to turn off the electronics. In the example of FIG. 2, the electronics include battery management systems which track and/or monitor the health and/or other metrics of the battery sub-modules and/or cells and it is important and/or desirable to track that information at all times. For example, with an aircraft, the aircraft may be powered down on weekdays and only flown on the weekend. The battery management systems should run throughout the week so that any bad battery sub-modules can be identified and/or an aircraft is not permitted to fly as or if needed.

As described above, in some embodiments, a battery sub-module is selected from the plurality of battery sub-modules in order to prevent cells in that battery sub-module from being drawn down to a voltage level at which irreparable damage occurs (e.g., and the entire battery sub-module must be replaced). The following figures describe some exemplary cell voltages and exemplary techniques for selecting a battery sub-module using those cell voltages.

Figure 6:
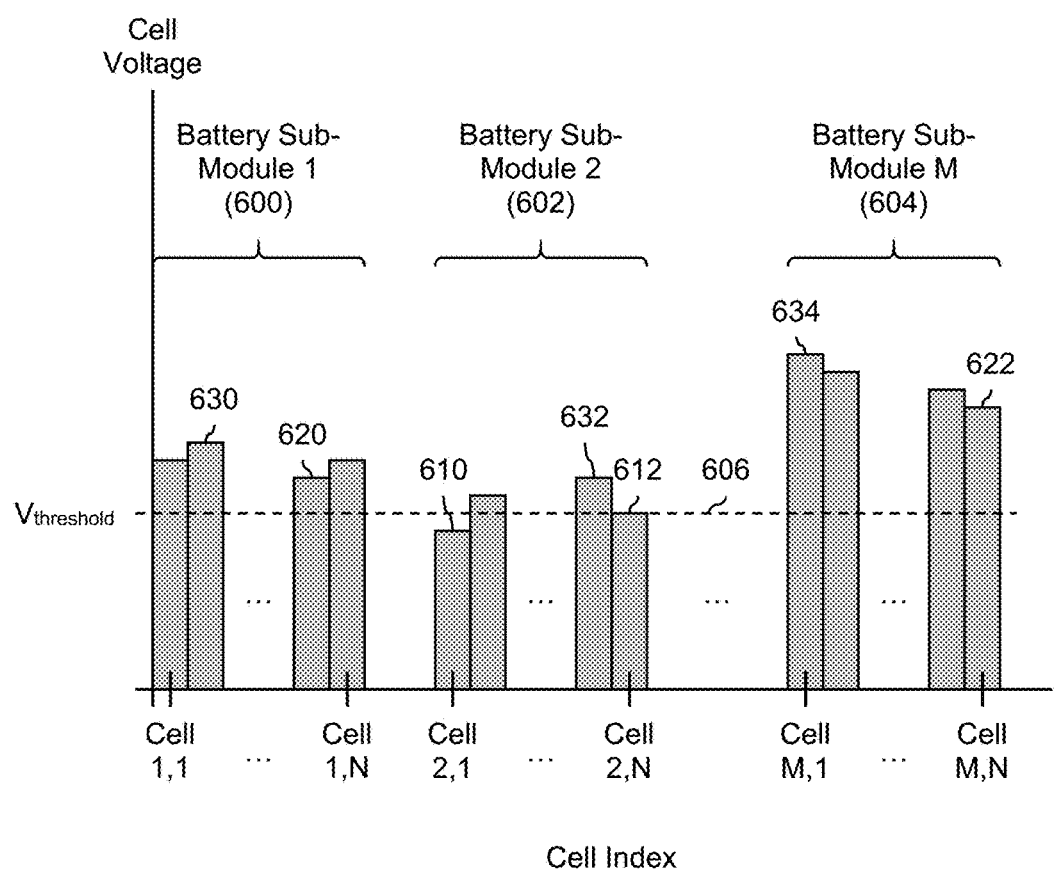
FIG. 6 is a diagram illustrating an embodiment of cell voltages in battery sub-modules in a battery system.

FIG. 6 is a diagram illustrating an embodiment of cell voltages in battery sub-modules in a battery system. In this example, there are M battery sub-modules and N cells per battery sub-modules to be consistent with the example of FIG. 2. In the graph shown, the x-axis shows the cell index (defined by battery sub-module number and cell number within that battery sub-module) and the y-axis shows the cell voltage of the corresponding cell. Group 600 shows the cell voltages for the cells in the first battery sub-module, group 602 shows the cell voltages for the cells in the second battery sub-module, and group 604 shows the cell voltages for the cells in the $M^{th}$ battery sub-module.

For simplicity and ease of explanation, suppose that there is a voltage level, represented by $V_{threshold}$ (606), below which a cell will be permanently damaged if power continues to be drawn from that cell (e.g., standby or vampire power when the aircraft is powered down). For example, cell 2,1 (610) and cell 2,N (612), both of which are in the second battery sub-module (602), are at or below $V_{threshold}$ (606). To ensure that power is not further drawn from that battery sub-module, the second battery sub-module would be selected (e.g., at step 102 in FIG. 1) and the corresponding set of electronics (e.g., 206b in FIG. 2) would be configured so that they no longer draw power from the second battery sub-module (e.g., 200b in FIG. 2).

Returning briefly to FIG. 2, it would be desirable if the electronics controller (208) could receive cell voltages for only some cells per battery sub-modules instead of having to receive cell voltages for all cells in a given battery sub-module. This would, for example, reduce the amount of traffic or communications exchanged between the electronics controller (208) and the lower-level electronics (206a-206c).

In one example, the minimum cell voltage from each battery sub-module is sent to an electronics controller or other block which is making the selection. For example, the respective electronics controller (e.g., battery management system) may make this selection and upload only the minimum cell voltage to the electronics controller (e.g., BMS controller). In FIG. 6, this would mean selecting and sending the cell voltage for cell 1,(N−1) (620), which is the minimum cell voltage in the first battery sub-module (600), to such an electronics controller. For the second battery sub-module (602), the minimum cell voltage is the cell voltage for cell 2,1 (610) and would be selected and sent to the electronics controller. For the $M^{th}$ battery sub-module (604), the minimum cell voltage is the cell voltage for cell M,N (622) and that cell voltage would be selected and sent to the electronics controller.

In some embodiments, a battery sub-module is selected at step 102 in FIG. 1 using a threshold voltage. For example, if any battery sub-module has a minimum cell voltage that is below $V_{threshold}$ (606), then that battery sub-module is selected so that its corresponding electronics do not continue to draw power from that battery sub-module. For the exemplary cell voltages shown in FIG. 6, only the second battery sub-module (602) would be selected. As such, the corresponding electronics would be configured to at least temporarily not draw power from the second battery sub-module (e.g., either by turning off the second set of electronics or providing power from some other battery sub-module).

In some embodiments, the above steps are performed first (e.g., where the minimum cell voltage from each battery sub-module is compared against some voltage threshold, such as $V_{threshold}$ (606)). Then, from the pool of battery sub-modules which were above $V_{threshold}$, the n battery sub-modules with the n maximums of the (remaining) minimum cell voltages are used to provide power (at least temporarily) with the other battery cell-modules (including those with a minimum cell voltage below $V_{threshold}$) not providing power (at least temporarily). This draws down the n battery sub-modules, which makes those battery sub-modules more balanced with respect to the other battery sub-modules.

In FIG. 6, for example, the $M^{th}$ battery sub-module (604) has much higher cell voltages in general compared to the rest of the battery sub-modules. By drawing down the cell voltages of the $M^{th}$ battery sub-module (604), this may help to draw down the $M^{th}$ battery sub-module (604), the high-end outlier, without irreparably damaging the second battery sub-module (602), the low-end outlier. To put it another way, the first check or test (e.g., comparing the minimum cell voltages against $V_{threshold}$) ensures nothing fails or is broken and the second check or test (e.g., drawing power from the n battery sub-modules with the n maximums of the minimum cell voltages) is a performance-oriented selection (e.g., it does a better job at balancing than some other selection techniques and balanced battery sub-modules is good for performance).

In some embodiments, there are no battery sub-modules with minimum cell voltages below $V_{threshold}$ (606). In some such embodiments, the maximum cell voltage from each battery sub-module is obtained and the m battery sub-modules with the m maximums of the maximum cell voltages provide power (at least temporarily) while the rest of the battery sub-modules do not provide power (at least temporarily). In this situation, there is no battery sub-module which is in danger of being permanently damaged if it continues to supply power and so using the maximum cell voltage from each cell is an even better way to balance the sub-modules (e.g., even better than using the maximum of the minimum cell voltages). In the context of this kind of balancing, it's always beneficial to draw power from higher-voltage sub-modules than lower-voltage ones.

These examples are described more generally and/or formally in flowcharts below. In various applications and/or embodiments, the appropriate technique may be performed.

Figure 7:
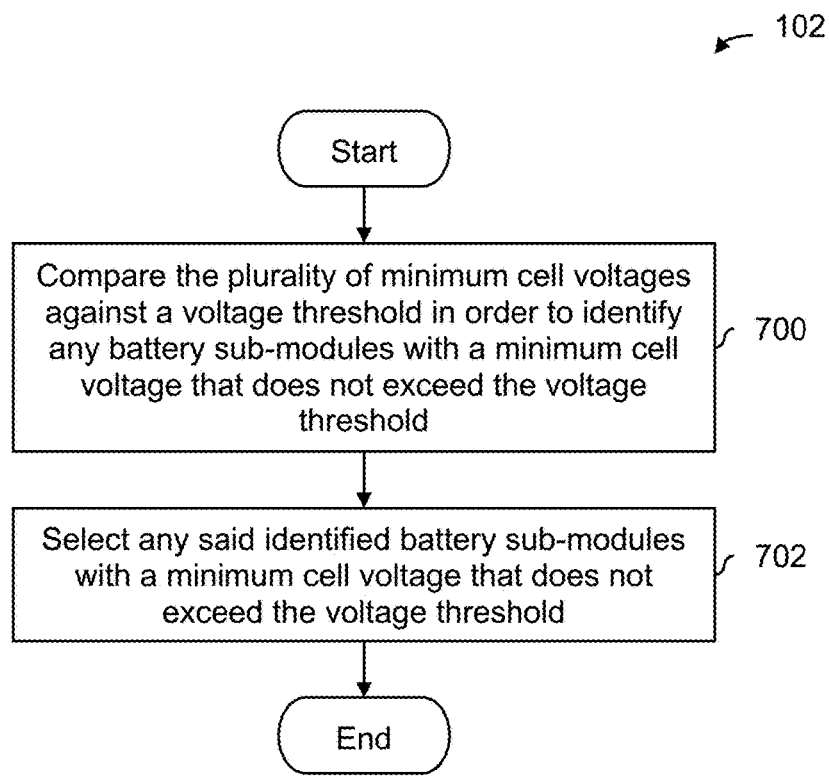
FIG. 7 is a flowchart illustrating an embodiment of a process to select a battery sub-module using a voltage threshold.

FIG. 7 is a flowchart illustrating an embodiment of a process to select a battery sub-module using a voltage threshold. In some embodiments, a battery sub-module is selected at step 102 in FIG. 1 using the example process described herein. In this example, receiving voltages at step 100 in FIG. 1 includes receiving, for each battery sub-module in the plurality of battery sub-modules connected together in series, a minimum cell voltage such that a plurality of minimum cell voltages is received.

At 700, the plurality of minimum cell voltages is compared against a voltage threshold in order to identify any battery sub-modules with a minimum cell voltage that does not exceed the voltage threshold. For example, in FIG. 6, the minimum cell voltages for cell 1,(N−1) (620), cell 2,1 (610), and cell M,N (622) are compared against $V_{threshold}$ (606). In that example, the only cell with a minimum cell voltage that does not exceed the voltage threshold is cell 2,1 (610).

At 702, any said identified battery sub-modules with a minimum cell voltage that does not exceed the voltage threshold is selected. To continue the example from FIG. 6, the second battery sub-module (602) would be selected. As such, the corresponding electronics would be configured so they do not draw power from the second battery sub-module (602), at least temporarily. The second battery sub-module (602) is vulnerable and could be damaged permanently if it continues to draw power.

Depending upon the design objectives and/or constraints, the appropriate technique for making a selection may be used. For example, the process of FIG. 7 is relatively simple. In some applications, if the performance improvements offered by other, more complicated processes is/are only marginal, then the process of FIG. 7 is used to make a selection.

Figure 8:
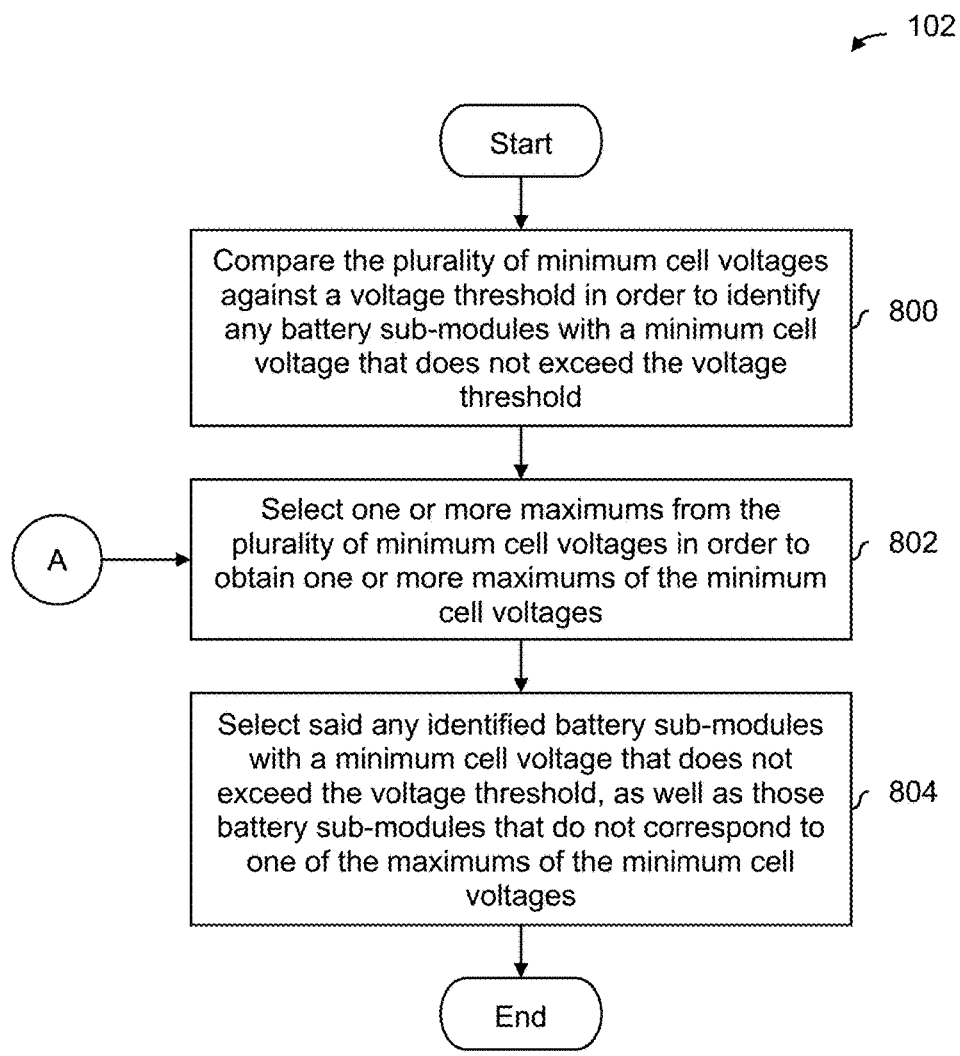
FIG. 8 is a flowchart illustrating an embodiment of a process to select a battery sub-module using a voltage threshold and maximums of minimum cell voltages.

FIG. 8 is a flowchart illustrating an embodiment of a process to select a battery sub-module using a voltage threshold and maximums of minimum cell voltages. In some embodiments, a battery sub-module is selected at step 102 in FIG. 1 using the example process described herein. In this example, receiving voltages at step 100 in FIG. 1 includes receiving, for each battery sub-module in the plurality of battery sub-modules connected together in series, a minimum cell voltage such that a plurality of minimum cell voltages is received.

At 800, the plurality of minimum cell voltages is compared against a voltage threshold in order to identify any battery sub-modules with a minimum cell voltage that does not exceed the voltage threshold. See, for example, FIG. 6 where the second battery sub-module (602) has a minimum cell voltage (610) that does not exceed the voltage threshold (606).

At 802, one or more maximums are selected from the plurality of minimum cell voltages in order to obtain one or more maximums of the minimum cell voltages. For example, in FIG. 6, the minimum cell voltages include the voltages for cell 1,(N−1) (620), cell 2,1 (610), and cell M,N (622) and the maximum of those is the voltage for cell M,N (622). For simplicity and ease of explanation, suppose that only one maximum is selected in this example of step 802 and subsequently at step 804.

At 804, said any identified battery sub-modules with a minimum cell voltage that does not exceed the voltage threshold is selected, as well as those battery sub-modules that do not correspond to one of the maximums of the minimum cell voltages. For example, the second battery sub-module (602) would be selected because it has a minimum cell voltage (610) that does not exceed the voltage threshold (606). Also, the first battery sub-module (600) does not correspond to the maximum of the minimum cell voltages and so the first battery sub-module would also be selected. In other words, the first battery sub-module (600) and the second battery sub-module (602) would not have to provide power (at least temporarily) while the $M^{th}$ battery sub-module (604) would provide power (e.g., during the time period in question). Intuitively, this makes sense because the $M^{th}$ battery sub-module (604) tends to have higher cell voltages compared to the other battery sub-modules.

Figure 9:
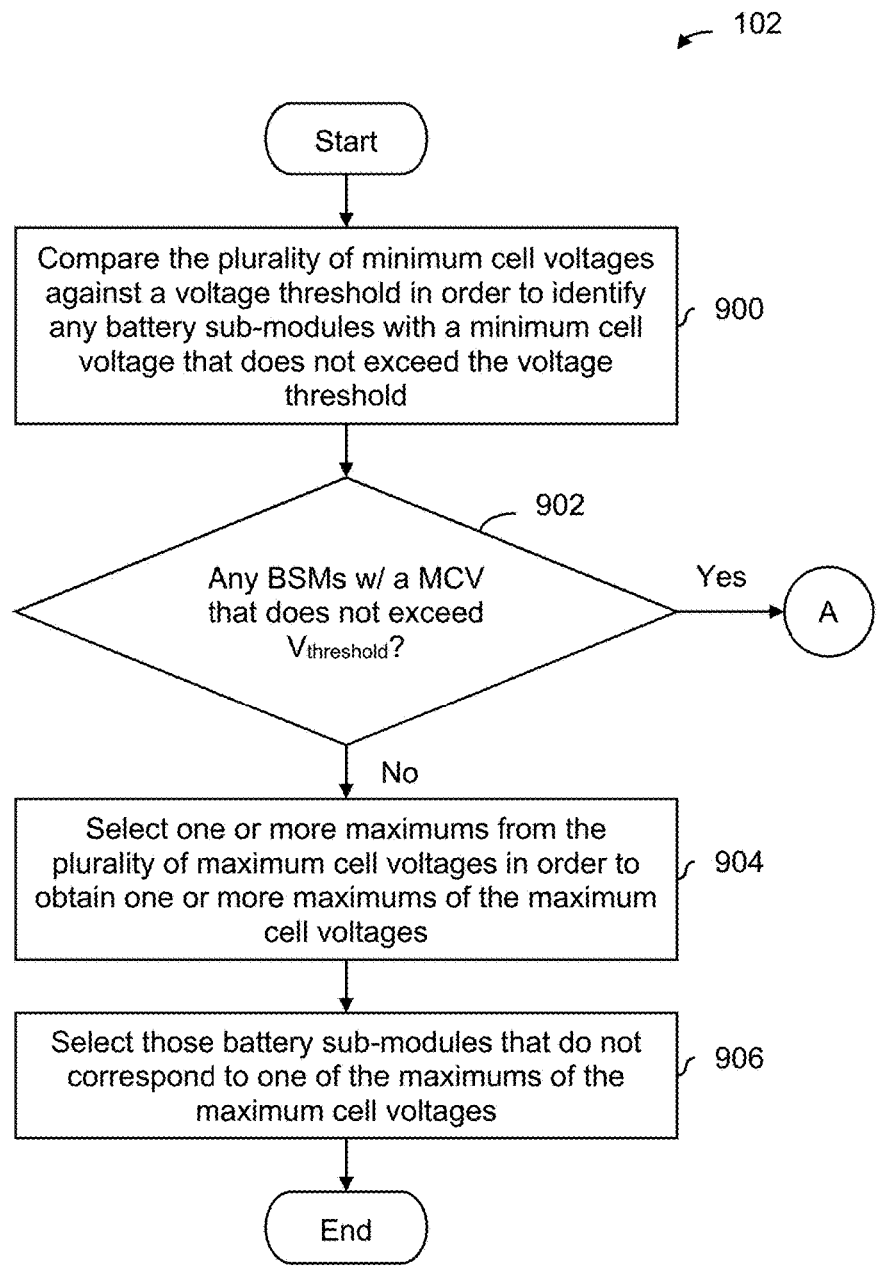
FIG. 9 is a flowchart illustrating an embodiment of a process to select a battery sub-module using a voltage threshold and maximums of maximum cell voltages.

In some applications, the process of FIG. 8 is used instead of the process of FIG. 7 because it enables better and/or faster balancing compared to FIG. 7, but without having to obtain additional cell voltages for each battery sub-module (e.g., per FIG. 9).

FIG. 9 is a flowchart illustrating an embodiment of a process to select a battery sub-module using a voltage threshold and maximums of maximum cell voltages. In some embodiments, a battery sub-module is selected at step 102 in FIG. 1 using the example process described herein. In this example, receiving voltages at step 100 in FIG. 1 includes receiving, for each battery sub-module in the plurality of battery sub-modules connected together in series, a minimum cell voltage and a maximum cell voltage such that a plurality of minimum cell voltages and a plurality of maximum cell voltages are received.

At 900, the plurality of minimum cell voltages is compared against a voltage threshold in order to identify any battery sub-modules with a minimum cell voltage that does not exceed the voltage threshold. See, for example, FIG. 6.

At 902, it is determined if there are any battery sub-modules with a minimum cell voltage that does not exceed the voltage threshold. For example, with the cell voltages shown in FIG. 6, this decision would be "Yes" because the minimum cell voltage for cell 2,1 (610) does not exceed the voltage threshold (606). In this example, the process would then proceed to step 802 in FIG. 8.

If, however, the decision at step 902 is "No" (e.g., because all of the minimum cell voltages exceed the voltage threshold), then one or more maximums are selected from the plurality of maximum cell voltages in order to obtain one or more maximums of the maximum cell voltages at 904. For example, the plurality of maximum cell voltages in FIG. 6 includes the cell voltages for cell 1,2 (630), cell 2,(N−1) (632), and cell M,1 (634). If only one maximum is selected, then the maximum of the maximum cell voltages would be the cell voltage for cell M,1 (634).

At 906, those battery sub-modules that do not correspond to one of the maximums of the maximum cell voltages are selected. In other words, the battery sub-modules corresponding to the maximums of the maximum cell voltages will provide power (at least temporarily) for some period of time. To continue the example from above, the $M^{th}$ battery sub-module would provide power (at least temporarily) while the other battery sub-modules would not provide power (at least temporarily).

In some applications, this technique enables the best and/or faster balancing but requires the use of both minimum cell voltages and maximum cell voltages, which requires more information to be exchanged between the (local) electronics (e.g., battery management systems) and the electronics controller (e.g., BMS controller). Depending upon the particular design objectives and/or limitations of the particular application, an appropriate technique may be selected. For example, if performance is important and the exchange of more and/or additional is an acceptable trade-off, then the process of FIG. 9 may be used.

As described above, in some embodiments, balancing is performed before and/or after charging. The following figures describe some example scenarios where balancing is performed both before and after charging, as well as only after charging.

Figure 10A:
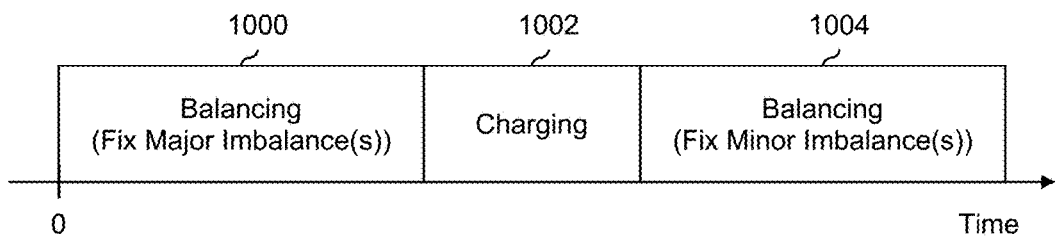
FIG. 10A is a diagram illustrating an embodiment where balancing is performed both before and after charging.

FIG. 10A is a diagram illustrating an embodiment where balancing is performed both before and after charging. In the example shown, the battery system has major imbalances between the various battery sub-modules and/or their underlying cells at time 0. For example, suppose that a BMS controller calculates an imbalance metric representing a degree or amount of imbalance in the battery system and the metric is relatively high and/or above some imbalance threshold. As described above, it is important for the battery system to be (e.g., sufficiently) balanced before charging. As such, in this example, a first pass of balancing is performed at 1000 (e.g., per any of the balancing techniques described above). For example, some battery sub-modules will provide power to various electronics in the system while other battery sub-modules do not provide power for some predefined amount of time and/or until some desired imbalance metric is reached.

Then, after the first pass or iteration of balancing is performed at 1000, the battery system is charged at 1002.

After charging (1002) has completed, there may still be some degree of imbalance in the battery system (e.g., carried over from the end of the first balancing pass) and/or additional imbalances may have been introduced by the charging process. As such, a second pass or iteration of balancing (e.g., per any of the techniques described above) is performed at 1004, but this time to address smaller and/or minor imbalances in the battery system.

Figure 10B:
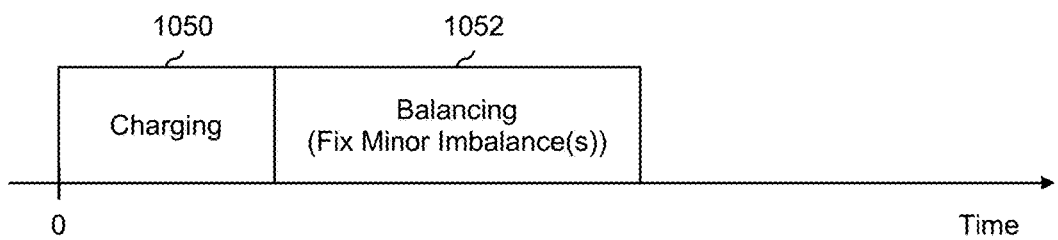
FIG. 10B is a diagram illustrating an embodiment where balancing is performed only after charging.

FIG. 10B is a diagram illustrating an embodiment where balancing is performed only after charging. In this example, the battery system has a relatively small amount or degree of imbalance between the battery sub-modules (and/or the underlying cells) when the overall process begins. To put it another way, at time 0, the battery sub-modules are sufficiently balanced so that charging can be performed immediately (e.g., without first having to run a balancing process). As before, a BMS controller may have determined an imbalance metric and compared it against some threshold in order to conclude that the battery system is sufficiently balanced to proceed with charging. As such, charging (1050) is immediately performed at time=0. After charging completes, balancing (1052) is performed (e.g., per any of the techniques described above) to address relatively small and/or minor imbalances existing in the battery system at that time.

A third possible scenario (not shown here for brevity) is to perform balancing before charging, but not after charging.

The following figure describes the above examples more generally and/or formally in a flowchart.

Figure 11:
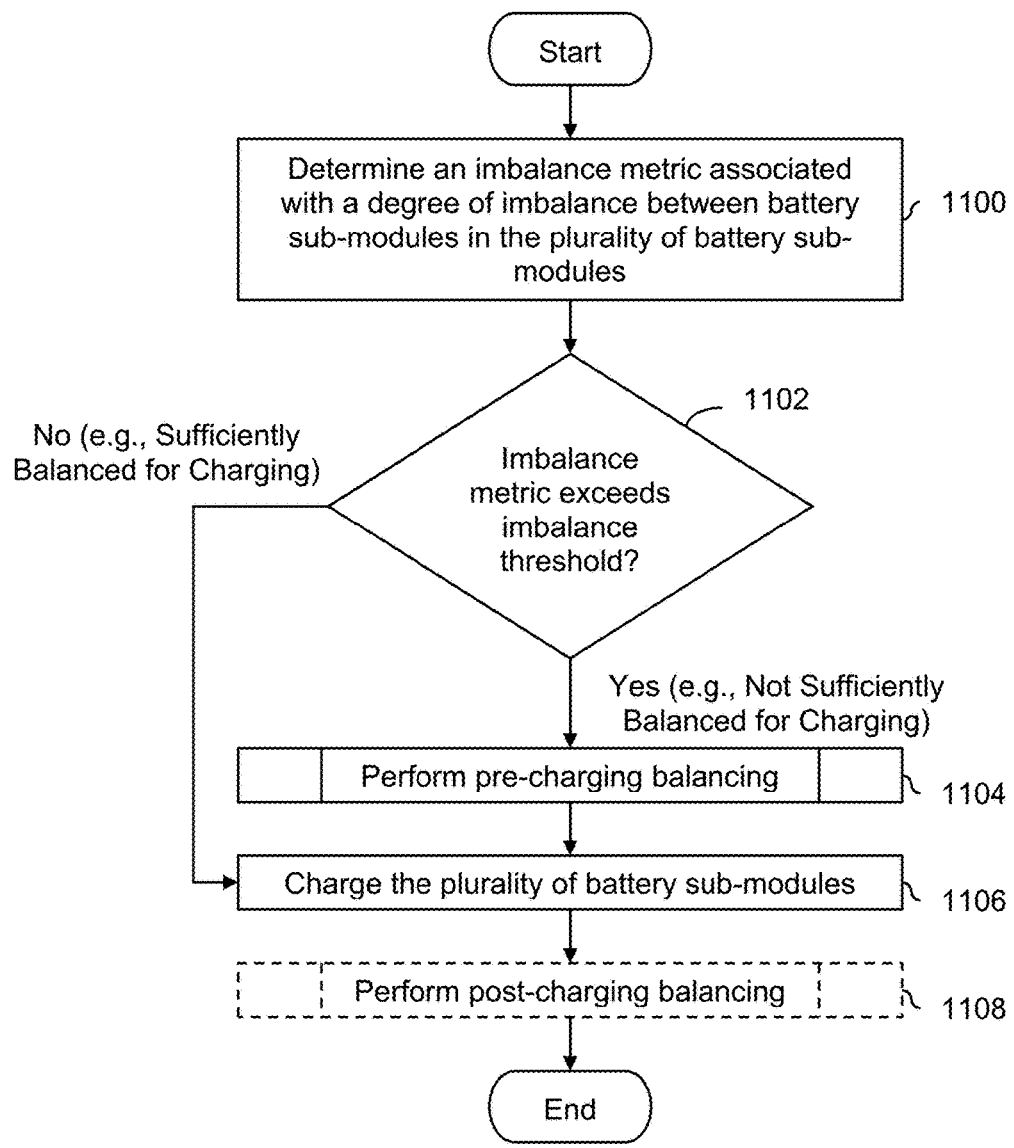
FIG. 11 is a flowchart illustrating an embodiment of a process to decide when to perform balancing relative to a charging process.

FIG. 11 is a flowchart illustrating an embodiment of a process to decide when to perform balancing relative to a charging process. In some embodiments, the process is performed by BMS controller 208 in FIG. 2.

At 1100, an imbalance metric associated with a degree of imbalance between battery sub-modules in the plurality of battery sub-modules is determined. An example of an imbalance metric is a difference between the maximum cell state of charge and minimum cell state of within a battery, referred to herein as RANGE(SOC). Another metric in this example is the amount of imbalance that can be dealt with over(?) the duration of one charge, referred to herein as maxImbalance. Straightforwardly, if RANGE(SOC)>maxImbalance, then it would be beneficial to balance before charging. If balance were not done before charging, then the battery would be charged until the maximum voltage cell reached the maximum cell voltage threshold (where going above this threshold would damage the cell). At this point, the battery would still be imbalanced and all high voltage cells would need to be drained until they reached the same voltage as the minimum voltage cell. After this, another charge would be performed until the now-balanced battery reached the max cell voltage.

This isn't really an issue if the aircraft is left attached to a charger for a very long period of time. In this case, the battery could be trickle-charged and kept topped off as the battery balances itself. However, in a high throughput environment where aircraft need to spend minimal time on the charger (e.g., an air taxi or shared use application), it is beneficial to pre-balance the battery (e.g., since there is no need to have a battery connected to a charger during that time).

Note that maxImbalance is actually a variable and not a fixed value. If the aircraft is fully discharged, it can nominally take 1.25 hours to charge. Since balancing can occur while charging and balancing happens at a set rate, the logic follows that if there is less than 1.25 hours' worth of balancing required, charging should proceed or otherwise be done without any fear of downtime. Otherwise, there would be a benefit from balancing beforehand if it is desired to minimize time on the charger. If only 0.5 hours' worth of charge is required (i.e., the plane was only partially discharged), then the threshold gets correspondingly smaller.

At 1102, it is determined if the imbalance metric exceeds an imbalance threshold. In this example, an imbalance metric with a larger value corresponds to a larger degree or amount of imbalance in the battery system and an imbalance metric with a smaller value corresponds to a smaller degree or amount of imbalance in the battery system. To put it another way, the imbalance threshold is used to decide if the battery system is sufficiently charged to begin charging right away, or if some balancing needs to be performed first.

If the imbalance metric exceeds the imbalance threshold at 1102 (e.g., the battery system is not sufficiently balanced for charging), then pre-charging balancing is performed at 1104. For example, any of the balance techniques described above (e.g., FIG. 1) may be used. After pre-charging balancing is performed at 1104, the plurality of battery sub-modules are charged at 1106.

If the imbalance metric does not exceed the imbalance threshold at 1102 (e.g., the battery system is sufficiently balanced for charging), then the plurality of battery sub-modules are charged at 1106 (e.g., without first performing balancing at step 1104).

In some embodiments, after the battery sub-modules are charged at step 1106, post-charging balancing is performed at 1108 (e.g., using any of the above described balancing techniques, such as FIG. 1). Alternatively, the step of post-charging balancing at 1108 may be skipped (e.g., because the degree or amount of imbalance in the battery system after charging does not warrant an iteration of balancing).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, for each battery sub-module in a plurality of battery sub-modules, a voltage associated with a cell in that battery sub-module, wherein each battery sub-module in the plurality of battery sub-modules includes a plurality of cells;
selecting a battery sub-module from the plurality of battery sub-modules based at least in part on the received voltages by:
comparing a plurality of minimum cell voltages against a voltage threshold in order to identify any battery sub-modules with a minimum cell voltage that does not exceed the voltage threshold;
selecting one or more maximums from the plurality of minimum cell voltages in order to obtain one or more maximums of the minimum cell voltages; and
selecting said any identified battery sub-modules with a minimum cell voltage that does not exceed the voltage threshold and that do not correspond to one of the maximums of the minimum cell voltages; and
configuring a set of one or more loads, which draws power from the selected battery sub-module and is not powered by any other battery sub-module in the plurality of battery sub-modules, so that the set of one or more loads at least temporarily does not draw power from the selected battery sub-module.

2. The method recited in claim 1, wherein configuring the set of one or more loads includes configuring the set of loads which draws power from the selected battery sub-module to be off.

3. The method recited in claim 1, wherein selecting the battery sub-module includes:
in response to determining that there are no battery sub-modules with a minimum cell voltage that does not exceed the voltage threshold:
selecting one or more maximums from a plurality of maximum cell voltages in order to obtain one or more maximums of the maximum cell voltages; and
selecting those battery sub-modules that do not correspond to one of the maximums of the maximum cell voltages.

4. The method recited in claim 1, further including:
determining an imbalance metric associated with a degree of imbalance between battery sub-modules in the plurality of battery sub-modules;
determining whether the imbalance metric exceeds an imbalance threshold;
in response to determining that the imbalance metric exceeds the imbalance threshold:
performing pre-charging balancing; and
charging the plurality of battery sub-modules; and
in response to determining that the imbalance metric does not exceed the imbalance threshold, charging the plurality of battery sub-modules.

5. The method recited in claim 1, further including:
determining an imbalance metric associated with a degree of imbalance between battery sub-modules in the plurality of battery sub-modules;
determining whether the imbalance metric exceeds an imbalance threshold;
in response to determining that the imbalance metric exceeds the imbalance threshold:
performing pre-charging balancing;
charging the plurality of battery sub-modules; and
performing post-charging balancing; and in response to determining that the imbalance metric does not exceed the imbalance threshold:
  charging the plurality of battery sub-modules; and
  performing post-charging balancing.

6. A system, comprising:
a processor; and
a memory coupled with the processor, wherein the memory is configured to provide the processor with instructions which when executed cause the processor to:
  receive, for each battery sub-module in a plurality of battery sub-modules, a voltage associated with a cell in that battery sub-module, wherein each battery sub-module in the plurality of battery sub-modules includes a plurality of cells;
  select a battery sub-module from the plurality of battery sub-modules based at least in part on the received voltages by:
    comparing a plurality of minimum cell voltages against a voltage threshold in order to identify any battery sub-modules with a minimum cell voltage that does not exceed the voltage threshold;
    selecting one or more maximums from the plurality of minimum cell voltages in order to obtain one or more maximums of the minimum cell voltages; and
    selecting said any identified battery sub-modules with a minimum cell voltage that does not exceed the voltage threshold and that do not correspond to one of the maximums of the minimum cell voltages; and
  configure a set of one or more loads, which draws power from the selected battery sub-module and is not powered by any other battery sub-module in the plurality of battery sub-modules, so that the set of one or more loads at least temporarily does not draw power from the selected battery sub-module.

7. The system recited in claim 6, wherein configuring the set of one or more loads includes configuring the set of loads which draws power from the selected battery sub-module to be off.

8. The system recited in claim 6, wherein selecting the battery sub-module includes:
  in response to determining that there are no battery sub-modules with a minimum cell voltage that does not exceed the voltage threshold:
    selecting one or more maximums from a plurality of maximum cell voltages in order to obtain one or more maximums of the maximum cell voltages; and
    selecting those battery sub-modules that do not correspond to one of the maximums of the maximum cell voltages.

9. The system recited in claim 6, wherein the memory is further configured to provide the processor with instructions which when executed cause the processor to:
  determine an imbalance metric associated with a degree of imbalance between battery sub-modules in the plurality of battery sub-modules;
  determine whether the imbalance metric exceeds an imbalance threshold;
  in response to determining that the imbalance metric exceeds the imbalance threshold:
    performing pre-charging balancing; and
    charging the plurality of battery sub-modules; and
  in response to determining that the imbalance metric does not exceed the imbalance threshold, charging the plurality of battery sub-modules.

10. The system recited in claim 6, wherein the memory is further configured to provide the processor with instructions which when executed cause the processor to:
  determine an imbalance metric associated with a degree of imbalance between battery sub-modules in the plurality of battery sub-modules;
  determine whether the imbalance metric exceeds an imbalance threshold;
  in response to determining that the imbalance metric exceeds the imbalance threshold:
    performing pre-charging balancing;
    charging the plurality of battery sub-modules; and
    performing post-charging balancing; and
  in response to determining that the imbalance metric does not exceed the imbalance threshold:
    charging the plurality of battery sub-modules; and
    performing post-charging balancing.

11. The system recited in claim 6, further comprising: the plurality of battery sub-modules and the set of one or more loads.

12. A computer program product, the computer program product being embodied in a non-transitory computer readable storage medium and comprising computer instructions for:
  receiving, for each battery sub-module in a plurality of battery sub-modules, a voltage associated with a cell in that battery sub-module, wherein each battery sub-module in the plurality of battery sub-modules includes a plurality of cells;
  selecting a battery sub-module from the plurality of battery sub-modules based at least in part on the received voltages by:
    comparing a plurality of minimum cell voltages against a voltage threshold in order to identify any battery sub-modules with a minimum cell voltage that does not exceed the voltage threshold;
    selecting one or more maximums from the plurality of minimum cell voltages in order to obtain one or more maximums of the minimum cell voltages; and
    selecting said any identified battery sub-modules with a minimum cell voltage that does not exceed the voltage threshold and that do not correspond to one of the maximums of the minimum cell voltages; and
  configuring a set of one or more loads, which draws power from the selected battery sub-module and is not powered by any other battery sub-module in the plurality of battery sub-modules, so that the set of one or more loads at least temporarily does not draw power from the selected battery sub-module.

13. The computer program product recited in claim 12, wherein the computer instructions for configuring the set of one or more loads include computer instructions for configuring the set of loads which draws power from the selected battery sub-module to be off.

14. The computer program product recited in claim 12, further comprising computer instructions for:
  determining an imbalance metric associated with a degree of imbalance between battery sub-modules in the plurality of battery sub-modules;
  determining whether the imbalance metric exceeds an imbalance threshold;

in response to determining that the imbalance metric exceeds the imbalance threshold:
performing pre-charging balancing; and
charging the plurality of battery sub-modules; and
in response to determining that the imbalance metric does not exceed the imbalance threshold, charging the plurality of battery sub-modules.

15. The computer program product recited in claim 12, further comprising computer instructions for:
determining an imbalance metric associated with a degree of imbalance between battery sub-modules in the plurality of battery sub-modules;
determining whether the imbalance metric exceeds an imbalance threshold;
in response to determining that the imbalance metric exceeds the imbalance threshold:
performing pre-charging balancing;
charging the plurality of battery sub-modules; and
performing post-charging balancing; and
in response to determining that the imbalance metric does not exceed the imbalance threshold:
charging the plurality of battery sub-modules; and
performing post-charging balancing.

* * * * *